(12) United States Patent
Yan et al.

(10) Patent No.: US 8,995,150 B2
(45) Date of Patent: Mar. 31, 2015

(54) PRIMARY SIDE SENSE OUTPUT CURRENT REGULATION

(71) Applicant: iWatt Inc., Campbell, CA (US)

(72) Inventors: Liang Yan, Milpitas, CA (US); John William Kesterson, Seaside, CA (US); Xiaoyan Wang, Milpitas, CA (US); Guang Feng, Cupertino, CA (US); Clarita Poon, Pleasanton, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 106 days.

(21) Appl. No.: 13/706,305

(22) Filed: Dec. 5, 2012

(65) Prior Publication Data

US 2014/0153292 A1 Jun. 5, 2014

(51) Int. Cl.
*H02M 3/335* (2006.01)
*H02M 1/00* (2006.01)

(52) U.S. Cl.
CPC ...... *H02M 3/33507* (2013.01); *H02M 3/33523* (2013.01); *H02M 2001/0009* (2013.01)
USPC ............ 363/21.17; 363/21.18; 363/21.16

(58) Field of Classification Search
USPC ......... 363/21, 21.12, 21.18, 18, 21.13, 21.15, 363/21.16, 21.17, 21.04, 21.05, 21.07, 363/21.08, 21.09, 21.1
See application file for complete search history.

(56) References Cited

U.S. PATENT DOCUMENTS

| | | | | |
|---|---|---|---|---|
| 5,684,680 A | * | 11/1997 | Tahhan et al. | 363/26 |
| 5,694,302 A | * | 12/1997 | Faulk | 363/16 |
| 5,734,564 A | * | 3/1998 | Brkovic | 363/21.16 |
| 5,754,415 A | * | 5/1998 | Blackmon | 363/21.16 |
| 7,443,700 B2 | * | 10/2008 | Yan et al. | 363/21.01 |
| 7,511,973 B2 | * | 3/2009 | Kesterson et al. | 363/21.01 |
| 7,974,107 B2 | * | 7/2011 | Li et al. | 363/21.01 |
| 8,018,743 B2 | * | 9/2011 | Wang et al. | 363/21.18 |
| 8,199,539 B2 | * | 6/2012 | Wang et al. | 363/21.18 |
| 2013/0119875 A1 | * | 5/2013 | Dearborn et al. | 315/186 |
| 2013/0294118 A1 | * | 11/2013 | So et al. | 363/21.16 |
| 2013/0301309 A1 | * | 11/2013 | Chen | 363/21.12 |
| 2014/0092646 A1 | * | 4/2014 | Cleveland et al. | 363/21.14 |

OTHER PUBLICATIONS

Eom, H. et al., "Design Optimization of TRIAC-Cimmable AC-DC Converter in LED Lighting," IEEE, 2012, pp. 831-835.
European Patent Office, Search Report and Opinion, European Patent Application No. 13194511.5, Dec. 1, 2014, nine pages.
Hwang, J.T. et al., "Off-the-Line Primary Side Regulation LED Lamp Driver With Single-Stage PFC and TRIAC Dimming Using LED Forward Voltage and Duty Variation Tracking Control," *IEEE Journal of Solid-State Circuits*, Dec. 2012, pp. 3081-3094, vol. 47, No. 12.
Zhang, J. et al., "A Primary-Side Control Scheme for High-Power-Factor LED Driver With TRIAC Dimming Capability," *IEEE Transactions on Power Electronics*, Nov. 2012, pp. 4619-4629, vol. 27, No. 11.

* cited by examiner

*Primary Examiner* — Timothy J Dole
*Assistant Examiner* — Bryan R Perez
(74) *Attorney, Agent, or Firm* — Fenwick & West LLP

(57) ABSTRACT

The embodiments disclosed herein describe a method of a controller to maintain a substantially constant average output current at the output of a switching power converter. In one embodiment, the controller uses a regulation voltage that corresponds to the primary peak current regulation level to regulate the average output current.

14 Claims, 3 Drawing Sheets

PRIMARY SIDE SENSE OUTPUT CURRENT REGULATION

BACKGROUND

1. Field of Technology

The embodiments disclosed herein relate to switching power converters. More particularly, the embodiments disclosed herein relate to switching power converters for light-emitting diode (LED) drivers.

2. Description of the Related Arts

LEDs are being adopted in a wide variety of electronic applications, for example, architectural lighting, automotive head and tail lights, backlights for liquid crystal display devices including personal computers and high definition TVs, flashlights, etc. Compared to conventional lighting sources such as incandescent lamps and fluorescent lamps, LEDs have significant advantages, including high efficiency, good directionality, color stability, high reliability, long life time, small size, and environmental safety.

LEDs are current-driven devices, and thus regulating the current through the LEDs is an important control technique. A LED driver generally requires that a constant direct current (DC) current be provided to a LED load. Conventional techniques use primary feedback in a switching power converter to provide switching-cycle by switching-cycle output current regulation. The cycle-by-cycle constant current control generates an approximately constant power output since the LED load voltage is relatively constant.

However, LED drivers are required to provide high power factor to the input alternating current (AC) source. Power factor in switching power converters is defined as the ratio of the real power delivered to the load to the apparent power provided by the power source. Utility companies or government agencies require power factors in switching power converters to exceed a certain minimum level by regulation. Thus, switching power converters should deliver power from the power source to the load with a high power factor. Generally, high power factor requires that the input current follows the input voltage, such that a sinusoidal power flow results instead of a constant power flow which is converse to the approximately constant power output generated by cycle-by-cycle constant current control.

To provide high power factor, a controller of a conventional switching power converter uses primary feedback to sample the primary side current sense of the power converter using an analog-to-digital converter (ADC). The controller estimates the output current based on the primary side current sense. Based on the feedback of the primary side current sense, the conventional switching power converters can regulate average output current to provide high power factor. However, using the ADC in the conventional switching power converter increases system complexity. Furthermore, due to the high speed of the primary current of the conventional switching power converter, the ADC must be a high speed ADC in order to accurately sample the primary current thereby further increasing system costs.

SUMMARY

The embodiments disclosed herein provide a method of a switching power converter of a LED driver that regulates a substantially constant average output current at the output of the switching power converter. In one embodiment, a controller allows the output current to vary switching-cycle by switching-cycle, but regulates the average output current to be substantially constant.

To regulate the average output current, the controller calculates an estimated output current for each switching cycle of the power converter based on a regulation voltage from a previous switching cycle. The regulation voltage corresponds to the peak primary side current. The regulation voltage is revised based on a comparison of a reference output current and an average estimated output current for each switching cycle to regulate the average output current.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments disclosed herein can be readily understood by considering the following detailed description in conjunction with the accompanying drawings.

DETAILED DESCRIPTION OF EMBODIMENTS

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles discussed herein.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

The embodiments disclosed herein describe a method of a controller of an AC/DC flyback switching power converter of a LED driver that regulates the average output current to a reference current based on a primary side sense technique. In one embodiment, the controller allows the output current to vary switching-cycle by switching-cycle, but maintains a relatively constant average output current over a long period of time thereby providing high power factor. In one embodiment, instead of using an ADC to sample the primary current, the controller uses a regulation voltage Vipk_d that corresponds to the peak primary side current to regulate the average output current of the power converter.

Figure 1:
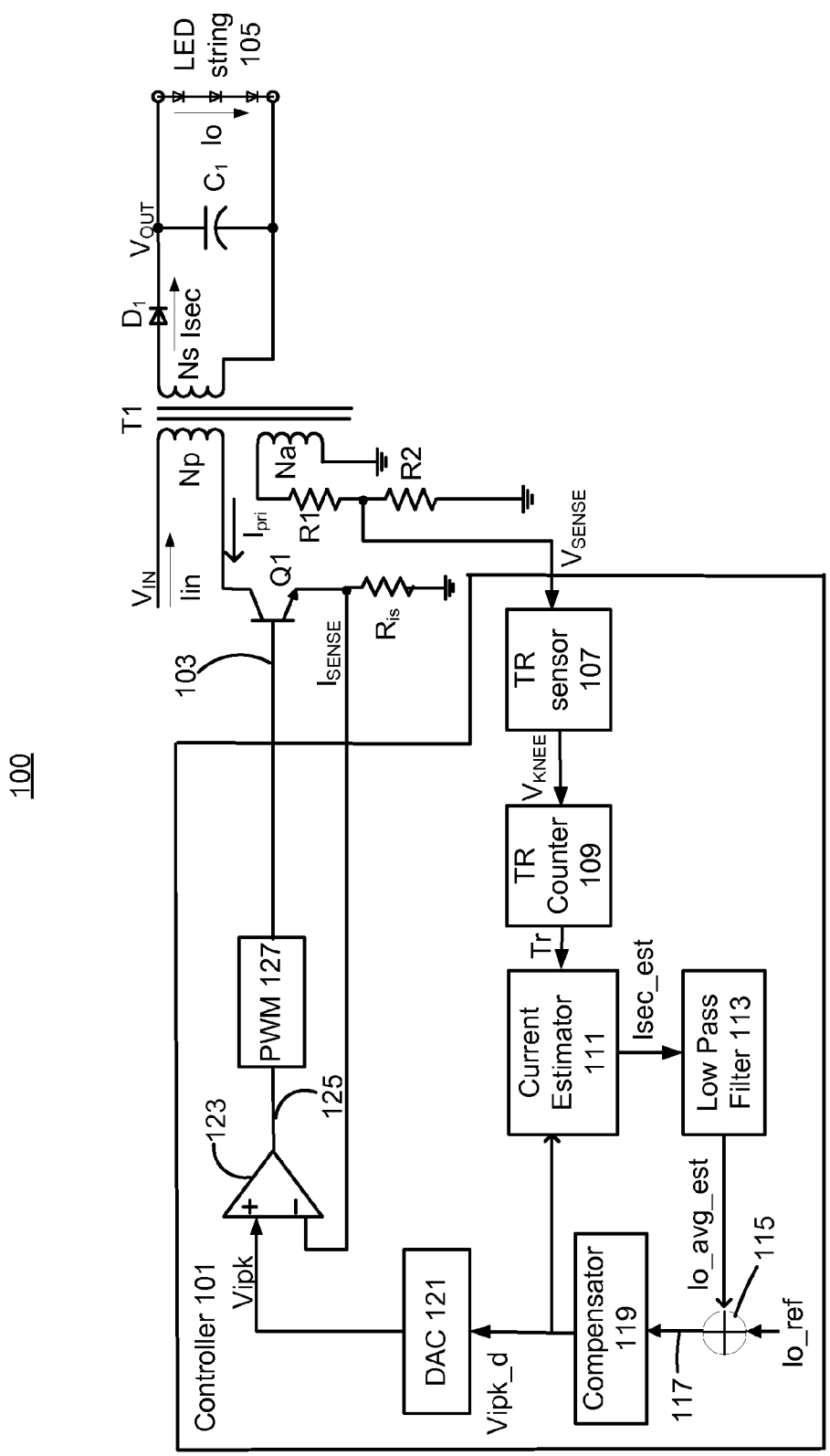
FIG. 1 is a circuit diagram of a switching power converter according to one embodiment.

FIG. 1 illustrates an AC to DC flyback switching power converter 100, according to one embodiment. The switching power converter 100 includes a power stage and a secondary output stage. Power stage includes a switch Q1 (shown as a bipolar junction transistor (BJT)) and a power transformer T1. Power transformer T1 includes primary winding Np, secondary winding Ns, and auxiliary winding Na. The secondary output stage includes diode $D_1$ and output capacitor $C_1$. Controller 101 controls the ON state and the OFF state of switch Q1 using output drive signal 103 in the form of a pulse with on-times ($T_{ON}$) and off-times ($T_{OFF}$). In other words, the controller 101 generates the output drive signal 103 that drives the switch Q1.

AC power is received from an AC power source (not shown) and is rectified to provide the unregulated input voltage $V_{IN}$. The input power is stored in transformer T1 while the switch Q1 is turned on, because the diode $D_1$ becomes reverse biased when the switch Q1 is turned on. The rectified input power is then transferred to the LED string 105 across the capacitor $C_1$ as the secondary current Isec flows through $D_1$ while the switch Q1 is turned off. Diode $D_1$ functions as an output rectifier and capacitor $C_1$ functions as an output filter. The resulting regulated output voltage $V_{OUT}$ and regulated output current $I_O$ is delivered to the LED string 105.

As mentioned previously, the controller 101 generates appropriate switch drive pulses 103 to control the on-times and off-times of switch Q1 thereby regulating the output current $I_O$. For each switching cycle, the controller 101 controls switch Q1 using a feedback loop based on the sensed output voltage $V_{SENSE}$ and the sensed primary side current $I_{pri}$ from the previous switching cycle of the switching power converter 100, in a variety of operation modes such as pulse width modulation PWM mode. $I_{SENSE}$ is used to sense the primary current $I_{pri}$ through the primary winding Np and switch Q1 in the form of a sensed voltage across sense resistor $R_{is}$. The output voltage $V_{OUT}$ is reflected across the auxiliary winding Na of transformer T1, which is input to controller 101 as the voltage $V_{SENSE}$ via a resistive voltage divider comprised of resistors $R_1$ and $R_2$.

As shown in FIG. 1, in one embodiment the controller 101 comprises a number of different circuits. Other circuits than those shown in FIG. 1 may be used in other embodiments.

A TR sensor 107 receives the voltage $V_{SENSE}$. In one embodiment, the TR sensor 107 detects the knee voltage (i.e., the falling edge) in the $V_{SENSE}$ signal within each switching cycle. In one embodiment, the knee voltage $V_{KNEE}$ is used by the TR counter 109 to calculate the reset time $T_R$ for the secondary winding Ns of the transformer T1 based on the knee voltage $V_{KNEE}$. The reset time TR is the duration of the current pulse on the secondary winding Ns, e.g., the time for the magnetic field of the secondary winding to collapse.

The current estimator 111 estimates the output current for each switching cycle of the power converter 100. In one embodiment, the current estimator 111 calculates an estimated output current Isec_est for each switching cycle of the power converter 100 based on the regulation voltage Vipk_d from a previous switching cycle, the reset time $T_R$ from the previous switching cycle, the number of windings N of the transformer T1, the resistance of sense resistor $R_{is}$, and the period $T_P$ of the previous switching cycle. In one embodiment, the estimated output current Isec_est is defined as:

$$\text{Isec\_est} = \frac{V_{ipk\_d} T_R N}{2 R_{is} T_P} = \frac{V_{ipk\_d} T_R}{T_P} K_{cr}$$

$$\text{where } K_{cr} = \frac{N}{2 R_{is}}$$

The current estimator 111 outputs the estimated output current Isec_est into a low pass filter 113. The low pass filter 113 removes (i.e. filters) any high frequency ripple in the estimated output current Isec_est to produce a substantially constant average output current estimation Io_avg_est. Note that the substantially constant average output current estimation Io_avg_est may ripple within defined hysteresis levels. A comparator 115 receives the average output current estimation Io_avg_est and compares it with a reference output current Io_ref. The reference output current Io_ref is representative of the regulation goal and can be generated in various ways. For example, a constant reference output current may be used which results in a constant current output. In one embodiment, the input current is sinusoidal and is in phase with the input voltage in order to provide high power factor. The comparator 115 provides the difference 117 between the average output current estimation Io_avg_est and the reference output current Io_ref to a compensator 119.

In one embodiment, the compensator 119 generates the regulation voltage Vipk_d which controls the primary peak current regulation level in each switching cycle of the power converter 100. Particularly, the regulation voltage Vipk_d is used to regulate the primary peak current regulation level in a subsequent switching cycle of the switching power converter 100. Note that Vipk_d is a digital representation of the regulation voltage.

In one embodiment, an initial regulation voltage may be set. The compensator 119 may update the regulation voltage during each switching cycle of the switching converter 100 based on the difference 117 between the average output current estimation Io_avg_est and the reference output current Io_ref. Thus, the compensator may increase or decrease the regulation voltage Vipk_d based on the difference 117 between the average output current estimation Io_avg_est and the reference output current Io_ref in order to regulate the average output current of the power converter 100. In one embodiment, the regulation voltage Vipk_d is also feedback to the current estimator 111. The current estimator 111 uses the regulation voltage Vipk_d to calculate the estimated output current Isec_est for the subsequent switching cycle of the power converter 100 to regulate the average output current in the switching cycle.

The regulation voltage Vipk_d is also provided to a digital-to-analog converter (DAC) 121. The DAC 121 converts the regulation voltage Vipk_d to an analog representation Vipk of the regulation voltage Vipk_d. A comparator 123 compares the regulation voltage Vipk with the voltage $I_{SENSE}$. Based on the comparison, the comparator 123 determines if the sensed peak primary current Ipri_pk reaches the desired reference current associated with the regulation voltage Vipk. When the sensed primary peak current exceeds the reference threshold, the comparator 123 generates a signal 125 that is transmitted to the PWM unit 127 to terminate the on state of the switch Q1. The PWM 127 outputs the driver output 103 that controls the on state (and off state) of the switch Q1 based on the signal 125.

Figure 2:
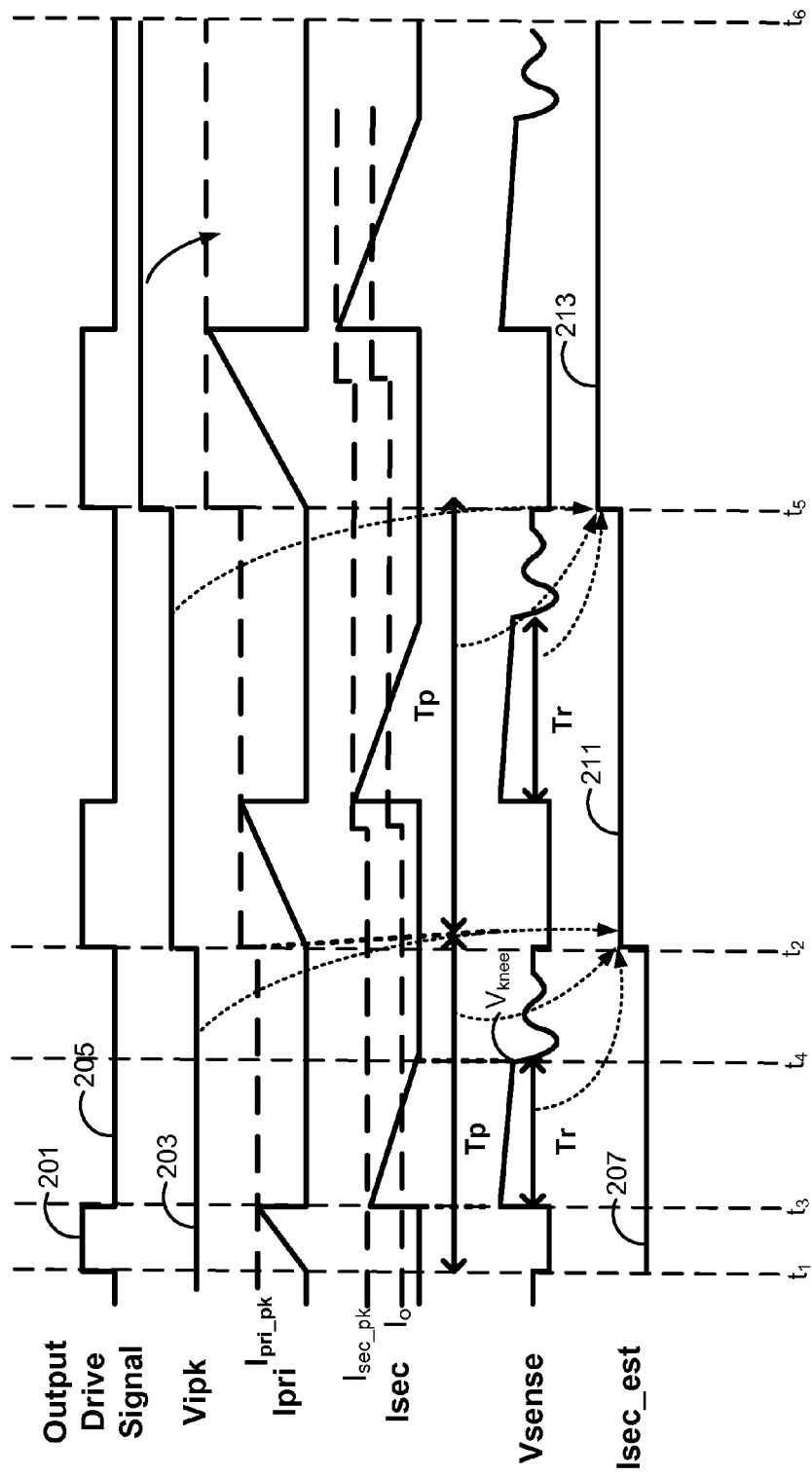
FIG. 2 is an example cycle-by-cycle waveform diagram of the switching power converter.

Referring now to FIG. 2, a timing diagram of an embodiment of the circuits illustrated in FIG. 1 is shown. Particularly, waveforms of the output drive signal 103, regulation voltage Vipk, primary side current $I_{pri}$, secondary current Isec, sensed output voltage $V_{SENSE}$, and the estimated output current Isec_est are shown over a plurality of switching cycles.

Time period $t_1$ to $t_2$ represents a period $T_P$ of a switching cycle of the power converter 100. At time $t_1$, the output drive signal transitions high 201 thereby turning on switch Q1. When the output drive signal is high 201, the regulation voltage Vipk is set to a first level 203 based on the estimated output current Isec_est calculated from the previous switching cycle. Note that the regulation voltage Vipk maintains the first level 203 throughout the switching cycle between time period $t_1$ to $t_2$.

When the switch Q1 is turned on at time $t_1$, the primary side current $I_{pri}$ increases until the peak primary side regulation current $I_{pri\_pk}$ is reached at time $t_3$. The primary side regulation current $I_{pri\_pk}$ corresponds to $V_{ipk}/R_{is}$. At time $t_3$, the output drive signal transitions low 205 thereby turning off the switch Q1. During time period $t_1$ to $t_3$, the secondary side current Isec and the sensed output voltage $V_{SENSE}$ is approximately zero. Additionally, during time period t1 to t3, the estimated output current Isec_est is a first level 207.

When the switch Q1 turns off at time $t_3$, the diode D1 becomes forward biased and the secondary side current Isec reaches the peak secondary side current Isec_pk. Furthermore, at time $t_3$, the output voltage Vout is reflected across the auxiliary winding Ta of Transformer T1 and is represented as $V_{SENSE}$. During time period $t_3$ to $t_4$, the secondary side current Isec decreases to approximately zero at time $t_4$. During time period $t_3$ and $t_4$, the sensed output voltage $V_{SENSE}$ also decreases until the knee voltage is reached at time $t_4$. Between time $t_4$ and time $t_2$, the sensed output voltage $V_{SENSE}$ rings until the next switching cycle begins.

Time period $t_2$ to $t_5$ represents a subsequent switching cycle of the power converter 100. As previously described above, the controller 101 calculates the estimated output current Isec_est based on the on the regulation voltage Vipk_d, the reset time $T_R$, and the period of the switching cycle $T_P$ from the previous switching cycle defined by time $t_1$ to $t_2$. Accordingly, the controller 101 calculates a second level 211 of the estimated output current Isec_est for the subsequent switching cycle defined during time period $t_2$ to $t_5$ based at least in part on the first level 203 of the regulation voltage Vipk_d, the period Tp and the reset time Tr from the first switching cycle defined by time period $t_1$ to $t_2$. The controller 101 performs similar options to calculate the level 213 of the estimated output current Isec_est for the switching cycle defined by time period $t_5$ to $t_6$.

Figure 3:
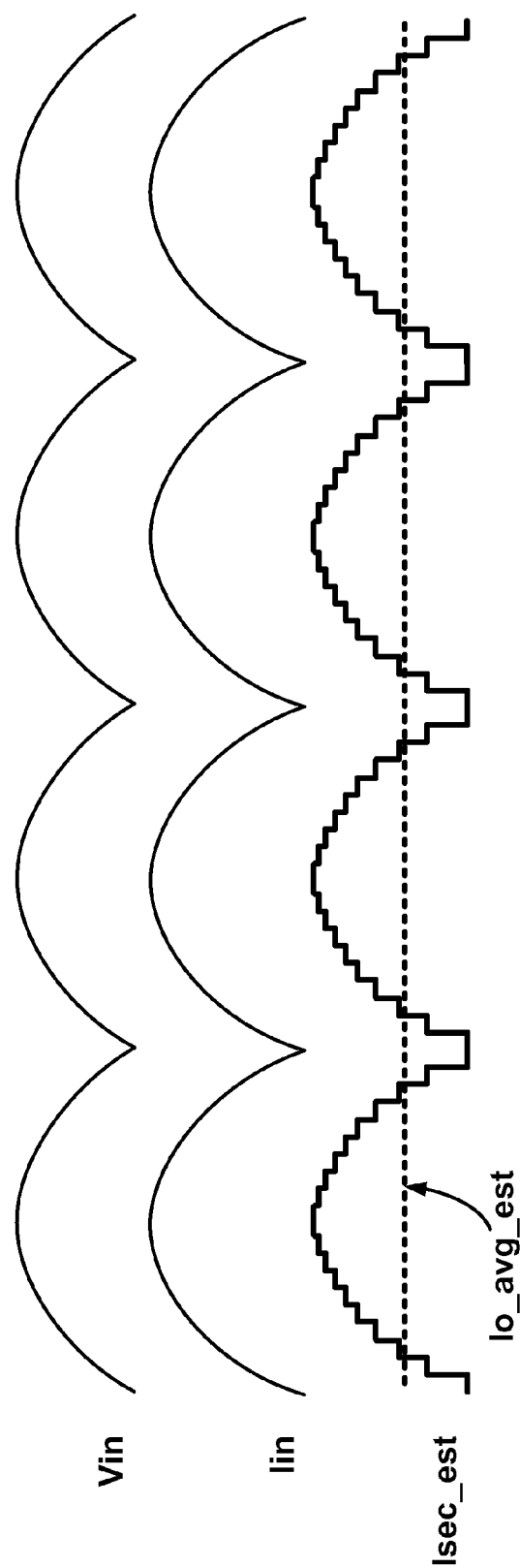
FIG. 3 is an example long period wave form of the switching power converter.

FIG. 3 is a timing diagram of an embodiment of the circuits illustrated in FIG. 1 over a period of time. Particularly, waveforms of the input voltage Vin, input current Iin, and estimated output current Isec_est are shown over a period of time. In FIG. 3, the input current Iin follows the input voltage Vin thereby providing high power factor. Furthermore, although the estimated output current Isec_est calculated by the power converter 100 also follows the input voltage Vin, the average output current estimation Io_avg_est is relatively constant during the time period thereby providing a relatively constant average output current to the LED string 105. That is, the estimated output current Isec_est can vary during each switching cycle shown by the sinusoidal nature of the estimated output current Isec_est. However, the controller 100 regulates the average output current Io_avg_est to be relatively constant during the plurality of switching cycles.

Upon reading this disclosure, those of skill in the art will appreciate still additional alternative designs for switching power converters. Thus, while particular embodiments and applications have been illustrated and described, it is to be understood that the embodiments discussed herein are not limited to the precise construction and components disclosed herein and that various modifications, changes and variations which will be apparent to those skilled in the art may be made in the arrangement, operation and details of the method and apparatus disclosed herein without departing from the spirit and scope of the disclosure.

What is claimed is:

1. A switching power converter comprising:
    a transformer including a primary winding coupled to an input voltage and a secondary winding coupled to an output of the switching power converter;
    a switch coupled to the primary winding of the transformer, current through the primary winding being generated while the switch is turned on and not being generated while the switch is turned off; and
    a controller configured to generate a control signal to turn on or turn off the switch at each switching cycle of the switch to regulate a varying output current at the output of the switching power converter while maintaining a substantially constant average output current at the output of the switching power converter;
    wherein the controller is configured to generate the control signal by estimating an average output current for each switching cycle of the switch based on a reset time of the transformer calculated from a sensed output voltage from a previous switching cycle and a regulation voltage corresponding to a peak of the current through the primary winding in the previous switching cycle.

2. The switching power converter of claim 1, wherein the controller is further configured to estimate the average output current for each switching cycle of the switch.

3. The switching power converter of claim 1, wherein the controller is further configured to generate the regulation voltage based on a comparison between the average output current and a reference output current.

4. The switching power converter of claim 3, wherein the controller is further configured to generate the regulation voltage by modifying a previously calculated regulation voltage from a prior switching cycle.

5. The switching power converter of claim 1, wherein the controller is further configured to generate the control signal based on a comparison between a sensed peak primary side voltage signal corresponding to the peak current through the primary winding and the regulation voltage.

6. The switching power converter of claim 1, wherein the controller is configured to estimate the average output current by removing high frequency noise from a calculated estimated output current.

7. The switching power converter of claim 1, wherein the controller is further configured to calculate the reset time of the transformer based on the sensed output voltage.

8. In a controller, a method of controlling a switching power converter, the switching power converter including a transformer coupled between an input voltage and an output of the switching power converter, the transformer including a primary winding coupled to the input voltage and a secondary winding coupled to the output of the switching power converter, and a switch coupled to the primary winding of the transformer, current through the primary winding being generated while the switch is turned on and not being generated while the switch is turned off, the method comprising:
    estimating an average output current for each switching cycle of the switch based on a reset time of the transformer from a previous switching cycle calculated from a sensed output voltage and a regulation voltage corresponding to a peak of the current through the primary winding in the previous switching cycle; and
    generating a control signal to turn on or turn off the switch at each switching cycle of the switch to regulate a varying output current at the output of the switching power converter while maintaining a substantially constant average output current at the output of the switching power converter based on the estimated average output current.

9. The method of claim 8, wherein the average output current is further estimated for each switching cycle of the switch based on a period of the previous switching cycle, a number of windings of the transformer, and a resistance of a sense resistor coupled to the switch and ground.

10. The method of claim 8, further comprising:
comparing the average output current and a reference output current; and
generating the regulation voltage based on the comparison.

11. The method of claim 10, wherein generating the regulation voltage comprises:
modifying a previously calculated regulation voltage from a prior switching cycle to generate the regulation voltage.

12. The method of claim 8, further comprising:
comparing a sensed primary side voltage signal corresponding to the peak current through the primary winding and the regulation voltage; and
generating the control signal based on the comparison.

13. The method of claim 8, wherein estimating the average output current comprises:
calculating an estimated output current; and
removing high frequency noise from the estimated output current to generate the average output current.

14. The method of claim 8, further comprising:
calculating the reset time of the transformer based on the sensed output voltage.

\* \* \* \* \*